United States Patent
Shi et al.

(10) Patent No.: US 12,368,536 B2
(45) Date of Patent: Jul. 22, 2025

(54) METHODS AND DEVICES FOR TRANSMITTING FEEDBACK INFORMATION

(71) Applicant: ZTE Corporation, Shenzhen (CN)

(72) Inventors: Jing Shi, Shenzhen (CN); Peng Hao, Shenzhen (CN); Wei Gou, Shenzhen (CN); Chenchen Zhang, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 285 days.

(21) Appl. No.: 17/885,898

(22) Filed: Aug. 11, 2022

(65) Prior Publication Data

US 2023/0011110 A1    Jan. 12, 2023

Related U.S. Application Data

(63) Continuation of application No. PCT/CN2020/075344, filed on Feb. 14, 2020.

(51) Int. Cl.
*H04L 1/1812* (2023.01)
*H04W 72/1273* (2023.01)
*H04W 72/23* (2023.01)

(52) U.S. Cl.
CPC ....... *H04L 1/1812* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2016/0359663 | A1* | 12/2016 | Song | H04L 5/003 |
| 2019/0349918 | A1* | 11/2019 | Nayeb Nazar | H04L 1/0057 |
| 2019/0363843 | A1* | 11/2019 | Gordaychik | H04W 72/044 |
| 2020/0053777 | A1* | 2/2020 | Babaei | H04W 16/14 |
| 2020/0145280 | A1* | 5/2020 | Cirik | H04L 41/0668 |
| 2020/0366417 | A1* | 11/2020 | Lei | H04L 1/1685 |
| 2021/0105126 | A1* | 4/2021 | Yi | H04L 1/1671 |
| 2021/0184812 | A1* | 6/2021 | MolavianJazi | H04L 1/0041 |
| 2021/0385822 | A1* | 12/2021 | Chae | H04W 72/0453 |
| 2022/0039157 | A1* | 2/2022 | Xu | H04L 1/1887 |
| 2022/0078768 | A1* | 3/2022 | El Hamss | H04L 5/0055 |
| 2022/0109527 | A1* | 4/2022 | Hwang | H04L 5/0055 |
| 2022/0183104 | A1* | 6/2022 | Babaei | H04L 1/1819 |

(Continued)

FOREIGN PATENT DOCUMENTS

| | | |
|---|---|---|
| CN | 101388756 A | 3/2009 |
| CN | 107347002 A | 11/2017 |

(Continued)

OTHER PUBLICATIONS

Partial Supplementary European Search Report regarding EP 20 88 8535 dated Sep. 13, 2023.

(Continued)

*Primary Examiner* — Phirin Sam
(74) *Attorney, Agent, or Firm* — Crowell & Moring LLP

(57) ABSTRACT

The present disclosure describes method, systems, and devices for transmitting feedback information by a communication node. The method includes sending a hybrid automated repeat request-acknowledgement (HARQ-ACK) in response to a preset rule being satisfied.

20 Claims, 16 Drawing Sheets

(56) References Cited

U.S. PATENT DOCUMENTS

| | | | | |
|---|---|---|---|---|
| 2022/0399960 A1* | 12/2022 | Bae | ............................ | H04L 5/00 |
| 2023/0074723 A1* | 3/2023 | Alfarhan | ............... | H04L 1/1685 |
| 2023/0145519 A1* | 5/2023 | Yi | ......................... | H04W 72/21 |
| | | | | 370/329 |

FOREIGN PATENT DOCUMENTS

| | | | |
|---|---|---|---|
| CN | 108347313 | A | 7/2018 |
| CN | 110603767 | A | 12/2019 |
| EP | 3414855 | A1 | 8/2017 |
| WO | WO 2014110790 | A1 | 7/2014 |
| WO | WO2019047676 | A1 | 3/2019 |
| WO | WO 2020017874 | A1 | 1/2020 |

OTHER PUBLICATIONS

Sharp, "HARQ enhancement for NR 1-4,6-9, INV.y unlicensed operation," 3GPP Draft; R1-1907214 NR-U_HARQ_SHARP, 3rd Generation Partnership Project (3GPP), Mobile Competence Centre; 650, Route Des Lucioles; F-06921 Sophia-Antipolis Cedex, France, vol. RAN WGI, No. Reno, Nevada, US, May 13, 2019, XP051728657, Retrieved from the Internet: URL:http://www.3gpp.org/ftp/Meetings%5F3GP\P%5FSYNC/RAN1/Docs/RI%2DI907214%2Ezip.

Convida Wireless, "On Intra-UE prioritization," 3GPP Draft; R1-1905449_ON_INTRAUE_PRIORITIZATION, 3rdGeneration Partnership Project (3GPP), Mobile Competence Centre; 650, Route Des Lucioles, F-06921 Sophia-Antipolis Cedex; France vol. RAN WGI, No. Xi'an, China; Apr. 8, 2019-Apr. 12, 2019, Apr. 3, 2019 (Apr. 3, 2019), XP051707518, Retrieved from the Internet: URL:http://www.3gpp.org/ftp/tsg%5Fran/WG1%5FRL1/TSGR1%5F96b/Docs/RI%2DI905449%2Ezip.

Extended European Search Report regarding EP 20 88 8535 dated Dec. 14, 2023, 16 pages.

Indian Patent Office First Examination Report regarding 202217037409 dated Jan. 9, 2023.

Korean Office Action with English summary of the Office Action regarding 10-2022-7025593 dated Dec. 6, 2024, 11 pages.

Huawei et al., R1-1910047, "HARQ enhancement in NR unlicensed," 3GPP TSG RAN WG1 #98bis, Chongqing, China, 12 pages, Oct. 14-20, 2019.

Chinese-language Office Action with English translation of the Office Action issued in Application No. 202080092924.2 dated Mar. 24, 2025 (13 pages).

Huawei, HiSilicon, R1-1903918 "UL transmission in preconfigured resource," 3GPP tsg_ran\wg1_rl 1, Issue tsgr1_96b, dated Mar. 30, 2019, 7 pages.

International Search Report and Written Opinion regarding PCT/CN2020/075344 dated Nov. 19, 2020.

* cited by examiner in response to a preset rule being satisfied, sending, by a user equipment, a hybrid automated repeat request - acknowledgement (HARQ-ACK)

410

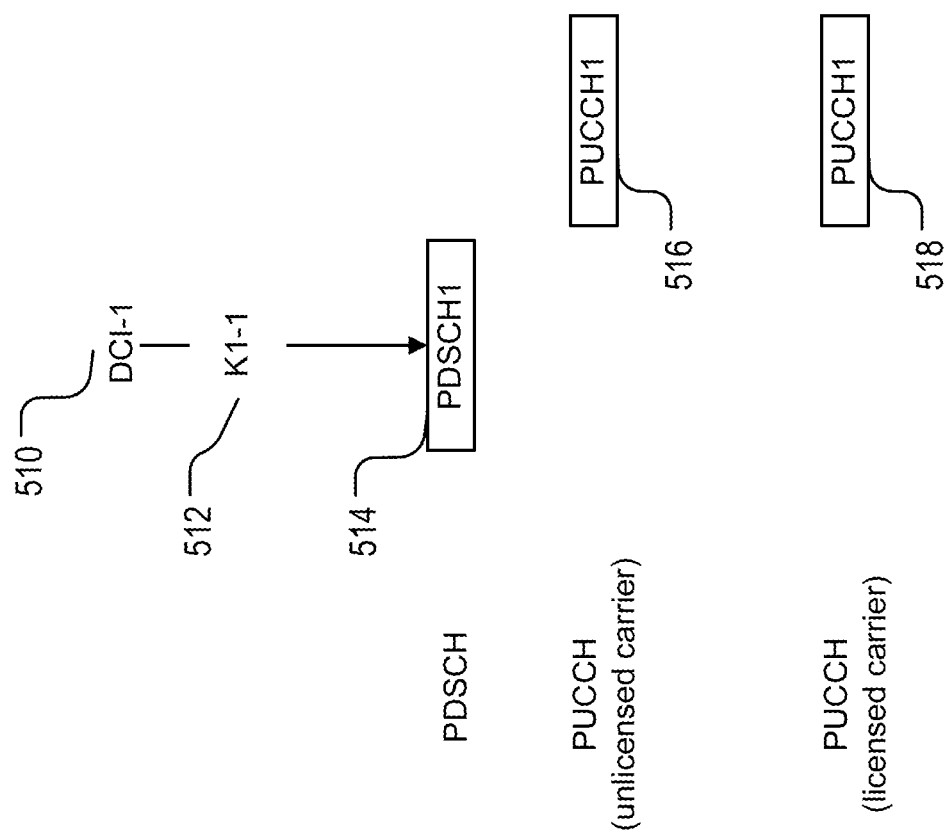

METHODS AND DEVICES FOR TRANSMITTING FEEDBACK INFORMATION

CROSS-REFERENCE TO RELATED APPLICATION

This application is a continuation application of PCT International Patent Application No. PCT/CN2020/075344, filed with the China National Intellectual Property Administration, PRC on Feb. 14, 2020, which is herein incorporated by reference in its entirety.

TECHNICAL FIELD

The present disclosure is directed generally to wireless communications. Particularly, the present disclosure relates to methods and devices for transmitting feedback information.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. URLLC may be supported on a licensed frequency carrier and/or an unlicensed frequency carrier. There are some issues and problems associated with transmitting feedback information, for example, how to improve the performance of transmitting feedback information. The present disclosure may address at least some of issues associated with the existing system to improve the performance of the wireless communication.

SUMMARY

This document relates to methods, systems, and devices for wireless communication, and more specifically, for transmitting feedback information.

In one embodiment, the present disclosure describes a method for transmitting feedback information by a communication node. The method includes sending a hybrid automated repeat request-acknowledgement (HARQ-ACK) in response to a preset rule being satisfied.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 5E shows another exemplary embodiment of transmitting feedback information.

DETAILED DESCRIPTION

Figure 1:
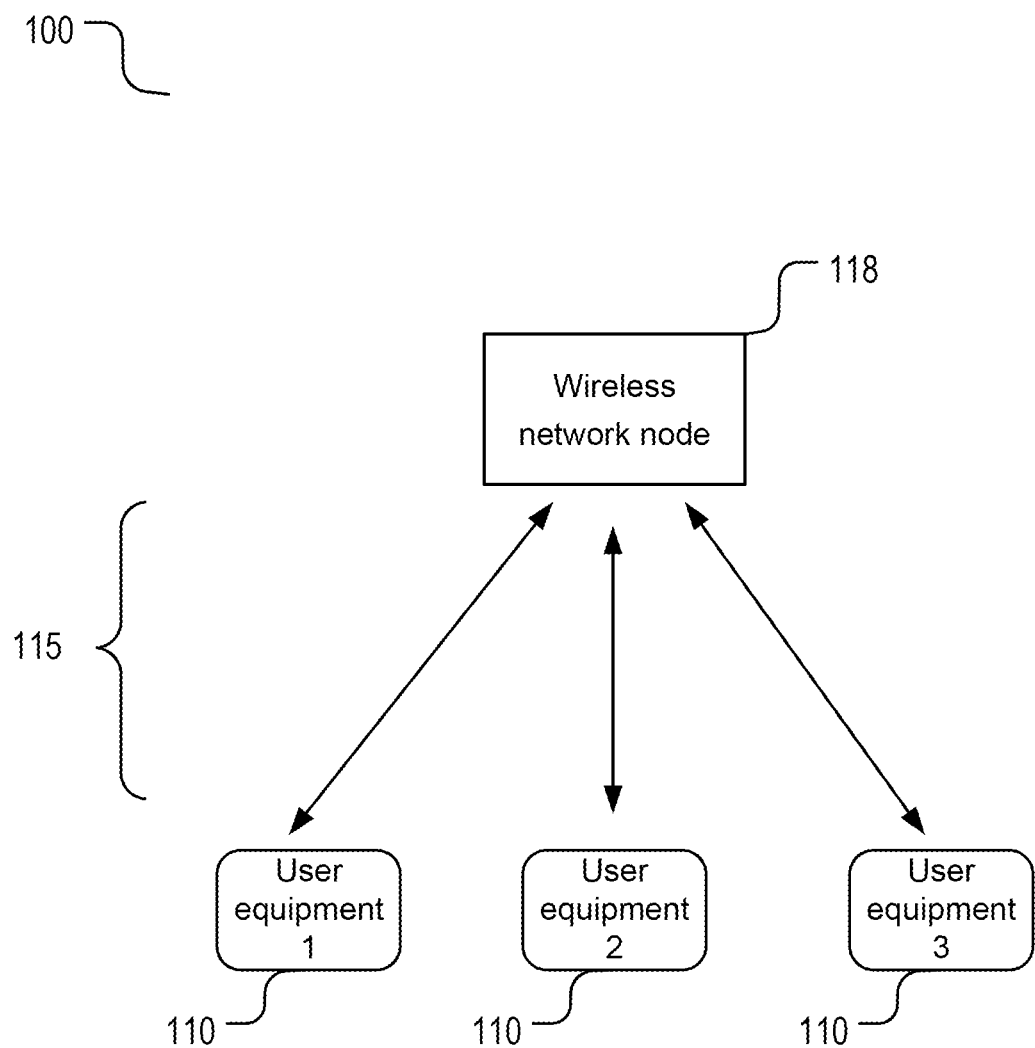
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The 'present disclosure describes methods and devices for transmitting feedback information, particularly, transmitting a hybrid automated repeat request-acknowledgement (HARQ-ACK).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. To increase bandwidth, shorten latency, and/or improve speed, the wireless communication may be carried on licensed frequency bands and/or new radio unlicensed (NR-U) frequency bands.

In the 5th generation (5G) communication system on licensed frequency carriers, a URLLC service may configure one or more subslots within one slot. Each of the one or more subslots may be configured to transmit the feedback information, so as to lower the latency in the URLLC service on licensed carriers.

In the 5th generation (5G) communication system on NR-U frequency carriers, problems exist so as to increase time needed for transmitting feedback information, thus increasing latency and worsening the performance of the communication system on NR-U frequency carriers. For example, one problem may be that, when a user equipment (UE) is unable to transmit the feedback information within a corresponding channel occupancy time (COT) (e.g., due to a failure of successfully competing for a resource channel for transmitting the feedback information), a non-numerical value of K1 may indicate the UE to store a HARQ-ACK corresponding to a physical downlink shared channel (PDSCH), and the UE may wait to send the HARQ-ACK until an indication of a numerical K1 in a received downlink control information (DCI), resulting in long latency and increasing the delay of transmitting the feedback information.

The present disclosure describes methods and devices for transmitting feedback information, for example, a HARQ-ACK. In some embodiments, the present disclosure may improve the efficiency of transmitting the HARQ-ACK for URLLC service on NR-U carriers. In some embodiments, the present disclosure may determine, under some circumstances, when a HARQ-ACK is overly delayed, that the UE may not send the delayed HARQ-ACK, so as to save physical uplink control channel (PUCCH) resource.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send a downlink control information (DCI) to the user equipment 110, and the DCI may include information to indicate how the UE may send the feedback information. The feedback information may include a HARQ-ACK.

Figure 2:
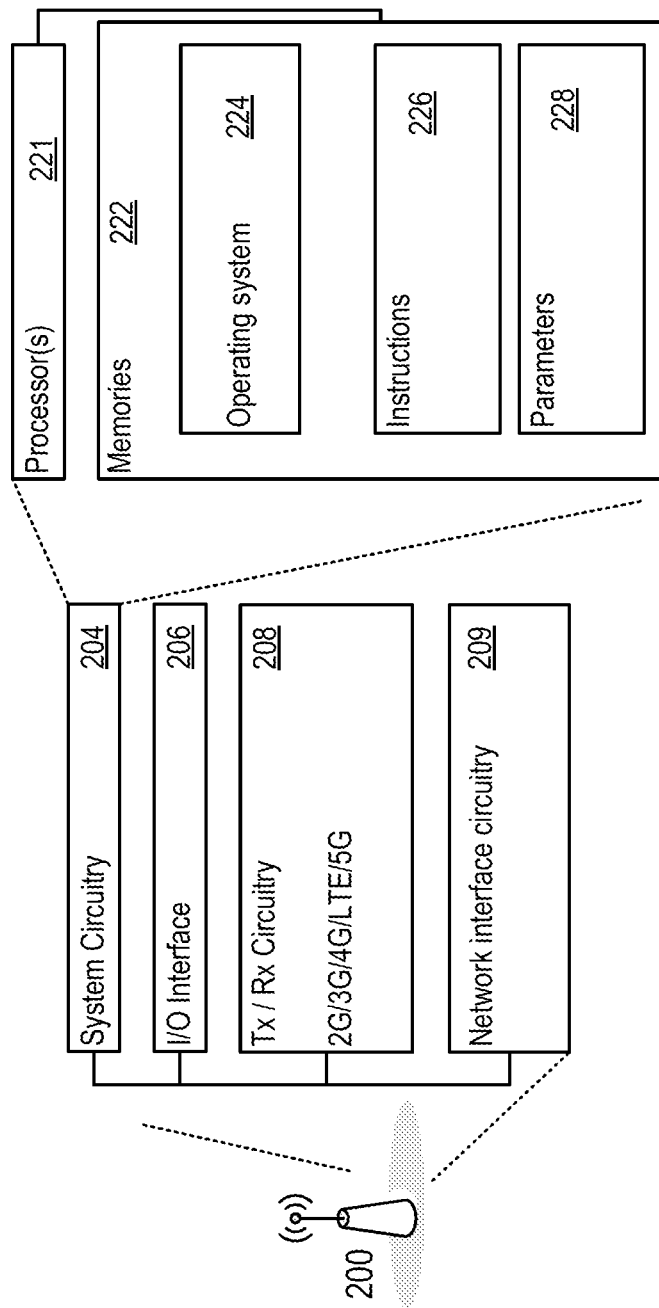
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
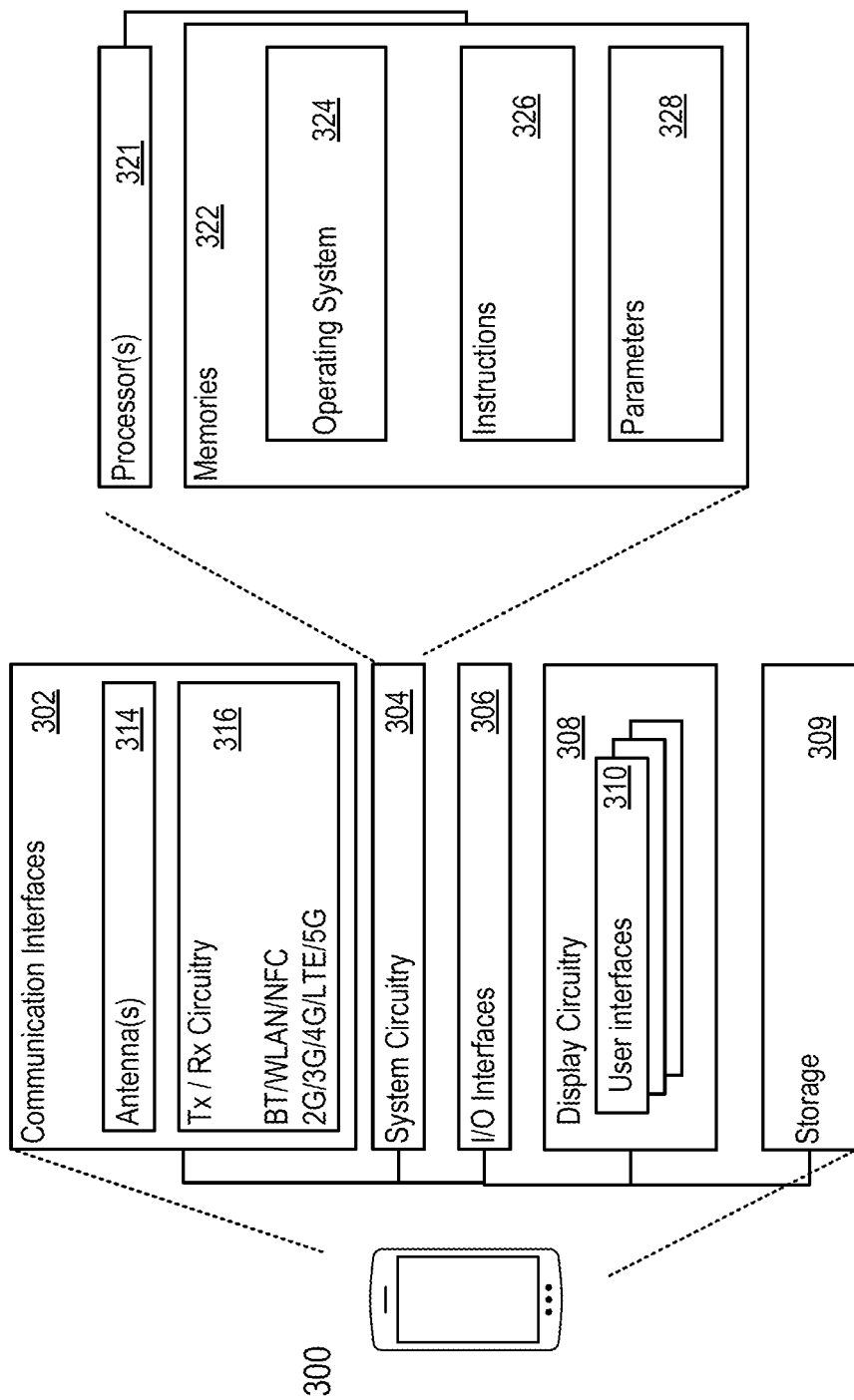
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above.

Figure 4:
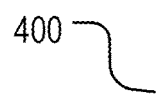
FIG. 4 shows a flow diagram of a method for wireless communication.

Referring to FIG. 4A, the present disclosure describes embodiments of a method 400 for transmitting feedback information. The method 400 may include step 410: in response to a preset rule being satisfied, sending, by a user equipment, a hybrid automated repeat request-acknowledgement (HARQ-ACK). In one implementation, the HARQ-ACK may be sent by the user equipment to a network base station (for example, a gNB).

In some embodiments, the preset rule may include whether the HARQ-ACK is sent by the user equipment. In one implementation, the user equipment may determine whether the preset rule is satisfied; and in response to the determining that the preset rule is satisfied, the user equipment may use a physical uplink control channel (PUCCH) resource to carry the HARQ-ACK.

Referring to FIGS. 5A-5L, a user equipment (UE) may receive a first downlink control information (first DCI, or DCI-1) 510. The first DCI (DCI-1) 510 may include a first K1 (K1-1) 512. The UE may receive corresponding first information through a first physical downlink shared channel (first PDSCH information, or PDSCH-1) 514 from the network base station. A first physical uplink control channel (first PUCCH resource, or PUCCH1) 516 may correspond to the PDSCH-1 514. A numerical K1 may indicate a scheduling timing between the PDSCH and the corresponding PUCCH. For example, there may be K1 number of slots (or subslots) between the PUCCH1 516 and the PDSCH-1 514. In some implementations, PUCCH1 516, PUCCH2 526, and PUCCH3 536 may be pre-configured to transmit feedback information, and when the UE successfully competes for one PUCCH resource, the UE may transmit a corresponding HARQ-ACK on the successfully competed PUCCH resource. For example, when the UE successfully competes PUCCH1 among PUCCH1, PUCCH2 and PUCCH3, the UE may transmit a corresponding HARQ-ACK on PUCCH1.

A second DCI (DCI-2) 520 may include a second K1 (K1-2) 522. The UE may receive second PDSCH information (PDSCH2) 524 from the network base station. A second PUCCH resource (PUCCH2) 526 may correspond to the PDSCH2 524. A third DCI (DCI-3) 530 may include a third K1 (K1-3) 532. The UE may receive third PDSCH information (PDSCH3) 534 from the network base station. A third PUCCH resource (PUCCH3) 536 may correspond to the PDSCH3 534.

A K1 in a DCI may be a non-numerical value. For example referring to FIG. 5A, the first K1 (K1-1) in the first DCI may be a non-numerical K1. The base station configures a non-numerical K1 in the DCI to notify the UE to store the HARQ-ACK. Upon receiving the first DCI and the first PDSCH information, the UE may store the HARQ-ACK corresponding to receiving the first PDSCH information.

A K1 in a DCI may be a numerical value. For example referring to FIG. 5B, the first K1 (K1-1) in the DCI-1 may be a numerical K1. The numerical K1 may indicate a scheduling timing between the PDSCH and the corresponding PUCCH. For example, there may be K1-1 number of slots (or subslots) between the PUCCH1 516 and the PDSCH-1 514.

Figure 5A:
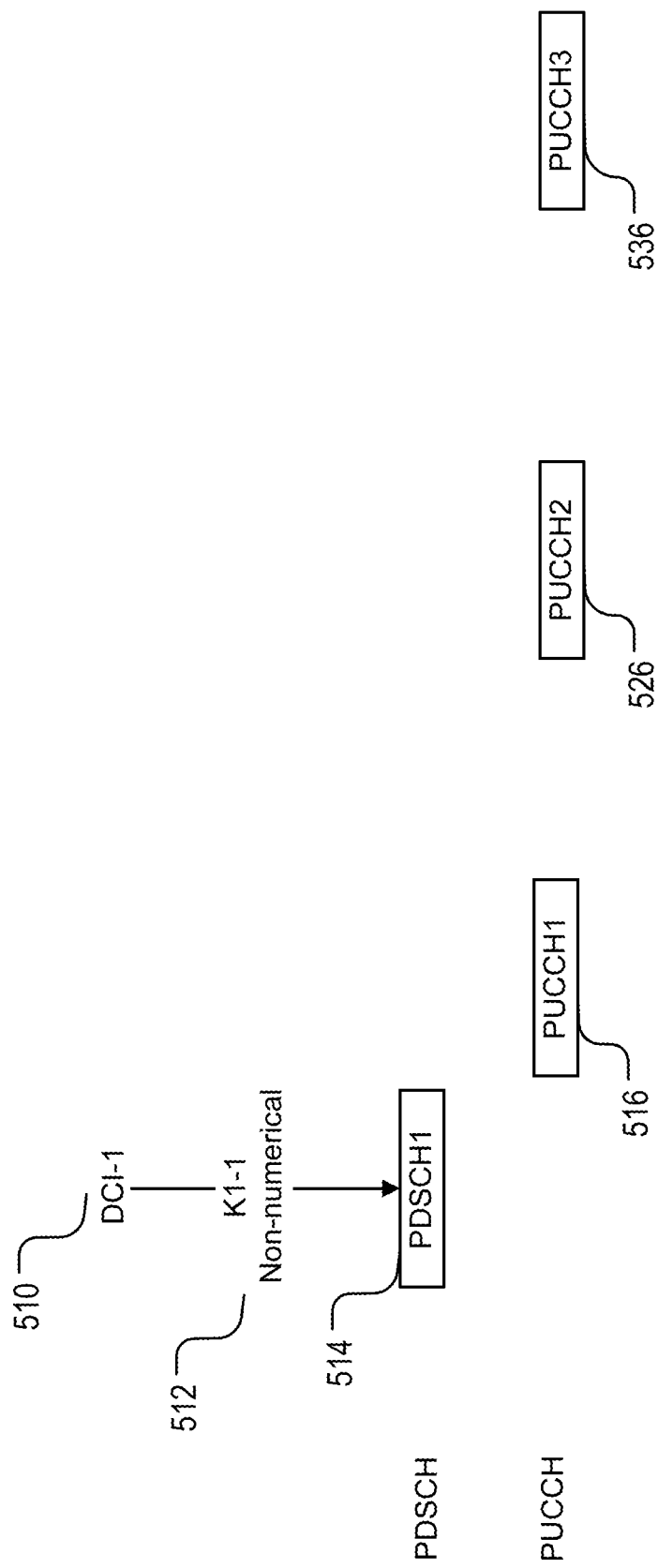
FIG. 5A shows an exemplary embodiment of transmitting feedback information.

In some embodiments referring to FIG. 5A with K1-1 as a non-numerical K1, the UE may compete for PUCCH resource among at least one configured PUCCH resources (e.g., among PUCCH1, PUCCH2, and/or PUCCH3). Upon successful completion of competing, for example, the UE may select a first successfully competed resource and use the first successfully competed resource to carry the HARQ-ACK. For example, when PUCCH1 516 is the first successfully competed resource, the UE may use the PUCCH1 516 to carry the HARQ-ACK. In another implementation, when the UE has stored the HARQ-ACK as a stored HARQ-ACK, the UE may use the PUCCH1 516 to carry the stored HARQ-ACK.

Figure 5B:
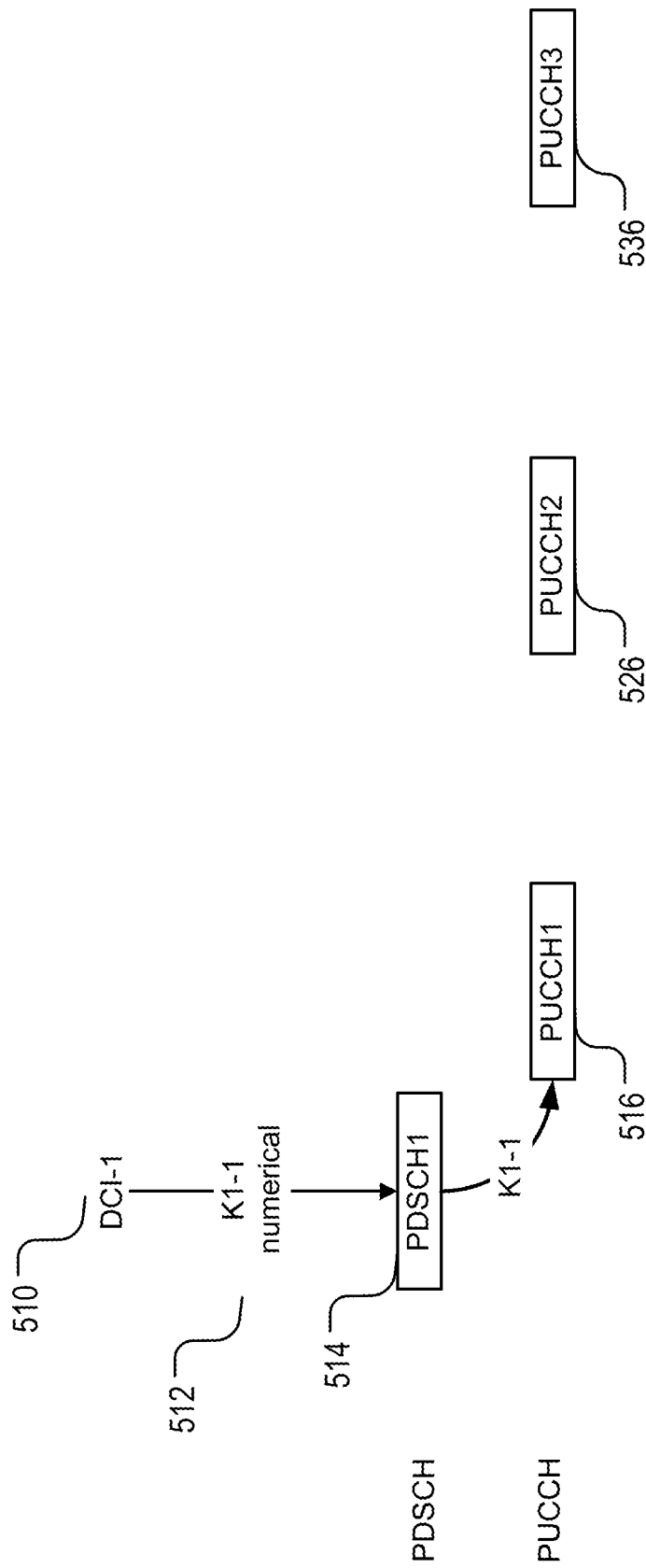
FIG. 5B shows another exemplary embodiment of transmitting feedback information.

In some embodiments referring to FIG. 5B with K1-1 as a numerical K1, the UE may use the configured PUCCH1 516 to carry the HARQ-ACK. Optionally and/or alternatively, the UE may also compete for PUCCH resource among at least one configured PUCCH resources (e.g., among PUCCH1, PUCCH2, and/or PUCCH3). Upon successful completion of competing, for example, the UE may select a first successfully competed resource and use the first successfully competed resource to carry the HARQ-ACK. For example, when PUCCH1 516 is the first successfully competed resource, the UE may use the PUCCH1 516 to carry the HARQ-ACK.

Figure 5C:
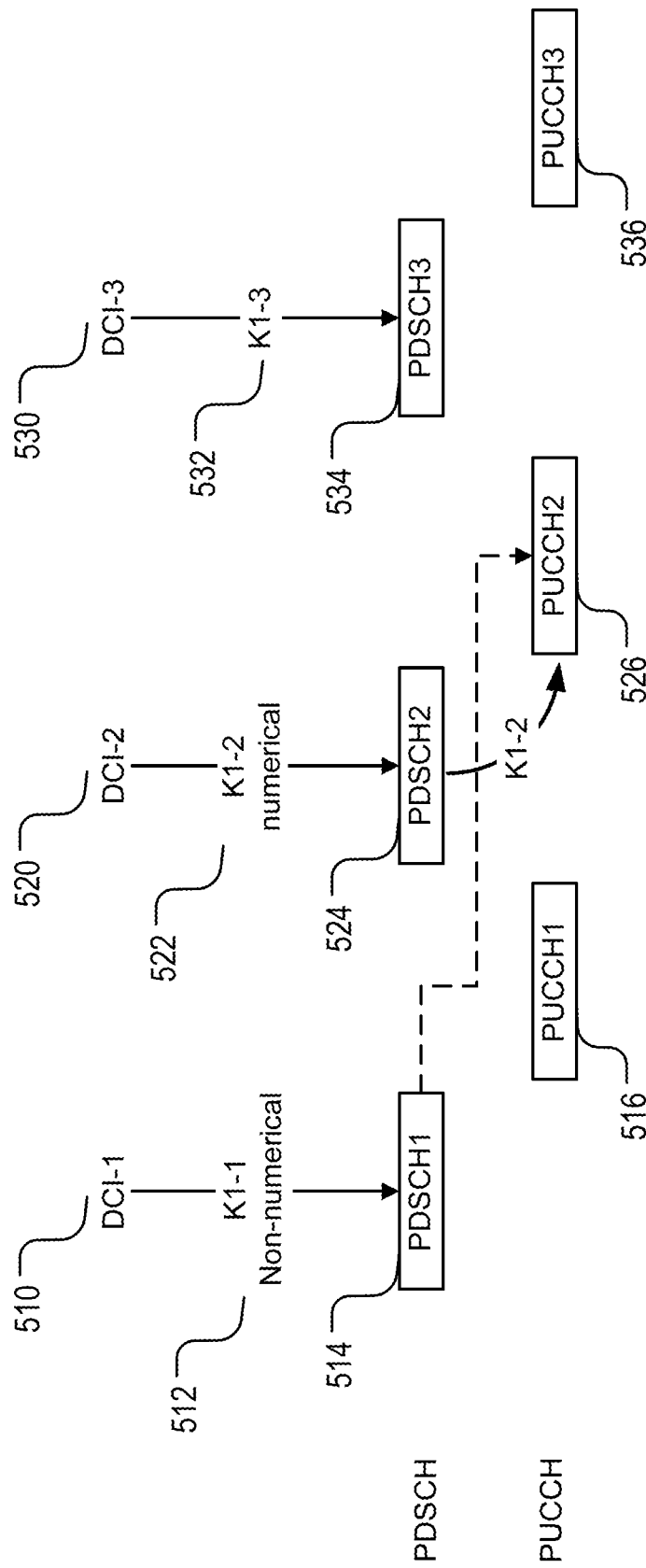
FIG. 5C shows another exemplary embodiment of transmitting feedback information.

In some embodiments referring to FIG. 5C with K1-1 as a non-numerical K1, the UE may store the HARQ-ACK corresponding to receiving the first PDSCH information. The UE may receive a second DCI (DCI-2). The DCI-2 may include a numerical K1-2. The UE may send the stored HARQ-ACK on a second PUCCH resource (PUCCH2). The PUCCH2 may correspond to the numerical K1-2. In some implementations, the UE may send the HARQ-ACK on a first successfully competed resource among at least one configured PUCCH resources, for example, on PUCCH1 as shown in FIG. 5A, and then the UE may send the HARQ-ACK again on the PUCCH2 as shown in FIG. 5C.

Figure 5D:
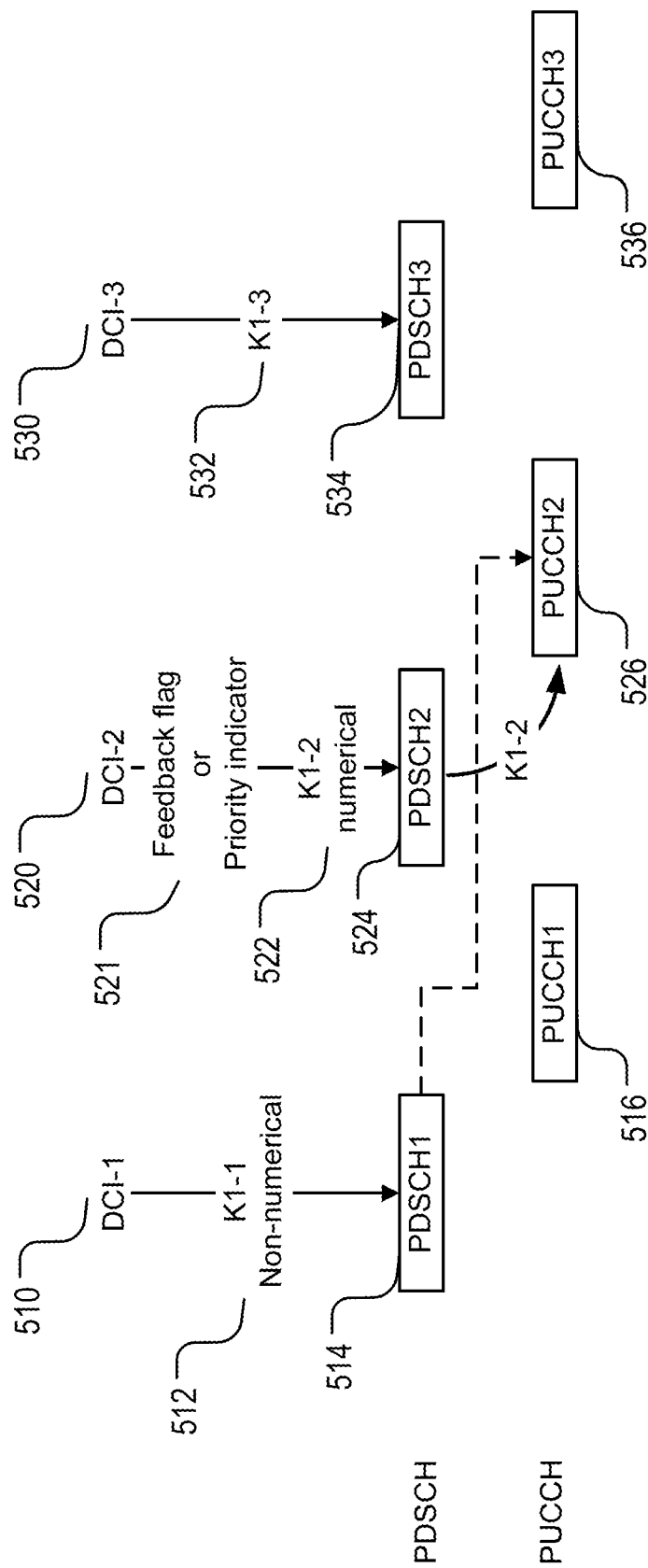
FIG. 5D shows another exemplary embodiment of transmitting feedback information.

In some embodiments referring to FIG. 5D, the UE may receive a second DCI (DCI-2) including a numerical K1-2 and a feedback flag. Optionally in some implementations, the previous DCI received by the UE may be DCI-1 including a non-numerical K1, and the UE may store the HARQ-ACK corresponding to receiving the first PDSCH information.

The feedback flag may indicate whether the UE sends the stored HARQ-ACK. The UE may determine whether the feedback flag is equal to a preset enable value or is equal to a preset disable value. In response to the feedback flag in the DCI-2 being the preset enable value, the UE may send the stored HARQ-ACK on a second PUCCH resource (PUCCH2). The PUCCH2 may correspond to the numerical K1-2. In response to the feedback flag in the DCI-2 is the preset disable value, the UE may not send the stored HARQ-ACK on PUCCH2. For example but not limited to, the UE may wait for a next DCI including a numerical K1 and feedback flag being the preset enable value to send the stored HARQ-ACK; otherwise the UE may remove the stored HARQ-ACK and/or do not send the stored HARQ-ACK if the feedback flag being the preset disable value. For example but not limited to, in one implementation, the preset enable value may be 1 and the preset disable value may be 0; or in another implementation, the preset enable value may be 0 and the preset disable value may be 1. In some implementations, the UE may send the HARQ-ACK on a first successfully competed resource among at least one configured PUCCH resources, for example, on PUCCH1 as shown in FIG. 5A, and then, when the feedback flag in DCI-2 enabling feedback, the UE may send the HARQ-ACK again on the PUCCH2 as shown in FIG. 5D.

In some embodiments referring to FIG. 5D, the DCI-2 may include a K1-2 and a priority indicator. The K1-2 may be a numerical K1. The priority indicator may indicate whether it belongs to high priority so that the UE sends the stored HARQ-ACK. The UE may determine whether the feedback flag is equal to a high-priority value or is equal to a low-priority value. In response to the priority indicator in the DCI-2 being the high-priority value, the UE may send the stored HARQ-ACK on a second PUCCH resource (PUCCH2). The PUCCH2 may correspond to the numerical K1-2. In response to the priority indicator in the DCI-2 is the low-priority value, the UE may not send the stored HARQ-ACK on PUCCH2. For example but not limited to, the UE may wait for a next DCI including a numerical K1 and proper feedback flag to send the stored HARQ-ACK; or the UE may remove the stored HARQ-ACK and/or do not send the stored HARQ-ACK. For example but not limited to, in one implementation, the high-priority value may be 1 and the low-priority value may be 0; or in another implementation, there may be a preset priority threshold, and the UE determine that the priority indicator is high priority when the priority indicator is larger than the preset priority threshold, and the priority indicator is low priority when the priority indicator is not larger than the preset priority threshold.

In some embodiments referring to FIG. 5E, a user equipment (UE) may receive DCI-1 including K1-1. K1-1 may include either a non-numerical K1 or a numerical K1. Two PUCCH carriers may be configured to a corresponding PDSCH. In one implementation, two PUCCH resources (516 and 518) may be configured corresponding to the PDSCH-1. One of the two configured PUCCH resources is a configured PUCCH resource on a unlicensed carrier (PUCCH1 516); and another of the two configured PUCCH resources is a configured PUCCH resource on a licensed carrier (PUCCH1 518).

When two PUCCH resources are configured corresponding to one PDSCH information, the base station may configure or notify the UE to select one of the two configured PUCCH resources.

In one implementation, the DCI sent by the base station to the UE may include a feedback-carrier selection flag. The feedback-carrier selection flag may indicate which one of the two configured PUCCH resources the UE selects to send the HARQ-ACK. The UE may determine whether the feedback-carrier selection flag is equal to a preset licensed-carrier enable value or is equal to a preset unlicensed-carrier enable value. In response to the feedback-carrier selection flag in the received DCI being the preset licensed-carrier enable value, the UE may select and use the PUCCH resource on the licensed carrier to transmit the HARQ-ACK. In response to the feedback-carrier selection flag is equal to the preset unlicensed-carrier enable value, the UE may select and use the PUCCH resource on the unlicensed carrier to transmit the HARQ-ACK. For example but not limited to, in one implementation, the preset licensed-carrier enable value may be 1 and the preset unlicensed-carrier enable value may be 0; or in another implementation, the preset licensed-carrier enable value may be 0 and the preset unlicensed-carrier enable value may be 1.

In another implementation, the DCI sent by the base station to the UE may include a priority indicator. The priority indicator may indicate which one of the two configured PUCCH resources the UE selects to send the HARQ-ACK. The UE may determine whether the priority indicator is equal to a high-priority value or is equal to a low-priority value. In response to the priority indicator in the received DCI being the high-priority, the UE may select and use the PUCCH resource on the licensed carrier to transmit the HARQ-ACK. In response to the priority indicator is equal to the low-priority value, the UE may select and use the PUCCH resource on the unlicensed carrier to transmit the HARQ-ACK. For example but not limited to, in one implementation, the high-priority value may be 1 and the low-priority value may be 0; or in another implementation, there may be a preset priority threshold, and the UE may determine that the priority indicator is high priority value when the priority indicator is larger than the preset priority threshold, and the priority indicator is low priority value when the priority indicator is not larger than the preset priority threshold.

In some embodiments, when a communication system transmits data using URLLC on NR-U frequency carriers, under certain conditions, for example, when the HARQ-ACK is overly delayed compared to a preset requirement, the communication system may determine not to transmit a HARQ-ACK, so as to save UCI or PUCCH resources, improving the performance of the URLLC. The present disclosure describes various embodiments wherein the wireless communication system determines whether a UE sends a corresponding HARQ-ACK.

In some embodiments, the preset rule in the method 400 may include whether a feedback flag in a received DCI is equal to a preset value. When the feedback flag is equal to the preset value, the UE may send a corresponding HARQ-ACK. When the feedback flag is not equal to the preset value, the UE may not send the corresponding HARQ-ACK. For example but not limited to, the UE may wait for a next DCI including a numerical K1 and proper feedback flag to send the corresponding HARQ-ACK; or the UE may remove the corresponding HARQ-ACK and/or do not send the corresponding HARQ-ACK. For example but not limited to, in one implementation, the preset value may be 1; or in another implementation, the preset value may be 0.

Figure 5F:
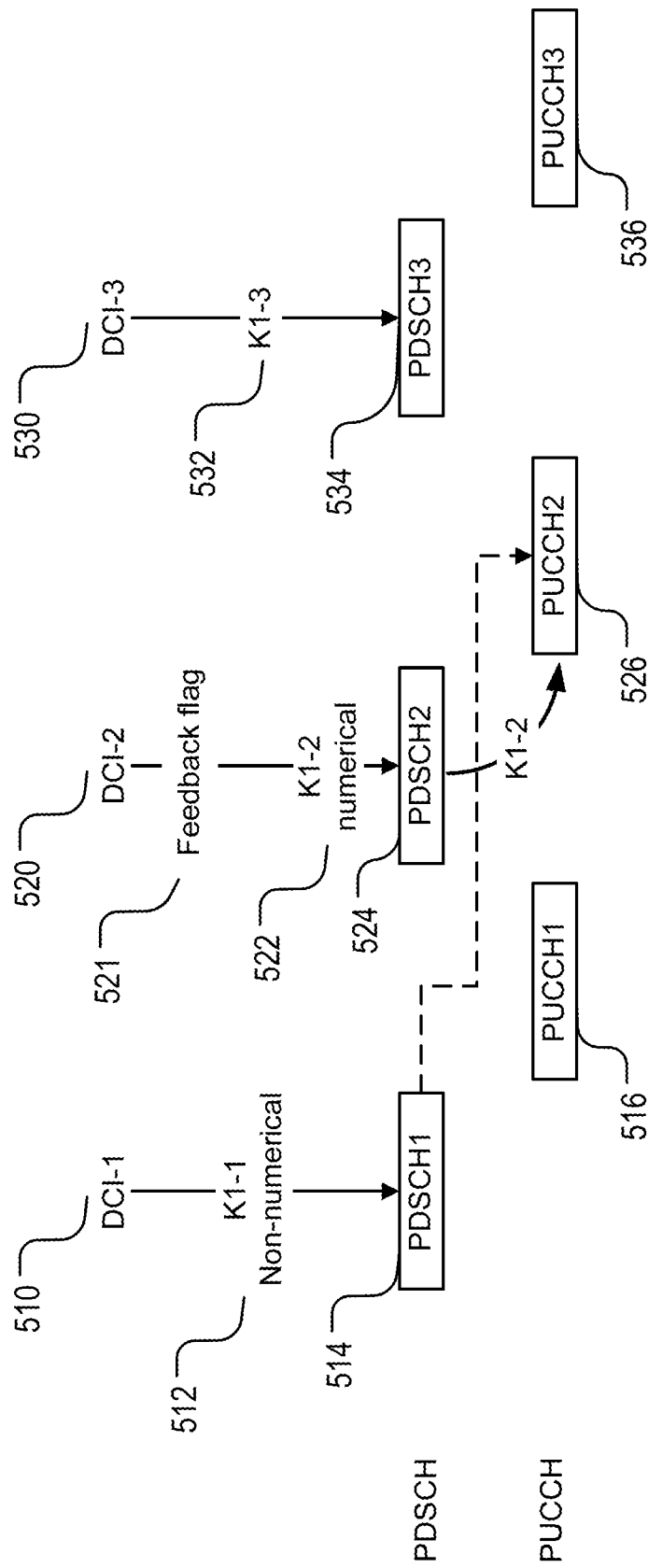
FIG. 5F shows another exemplary embodiment of transmitting feedback information.

In one implementation referring to FIG. 5F, the DCI-2 520 may include a numerical K1-2 and a feedback flag 521 indicating whether the UE sends a corresponding HARQ-ACK. In one implementation, the corresponding HARQ-ACK may be a HARQ-ACK stored by the UE as a stored HARQ-ACK according to the PDSCH-1 scheduled corresponding to a previously-received DCI (DCI-1). The DCI-1 may include a non-numerical K1. When the feedback flag is equal to the preset value, the UE may send the stored HARQ-ACK on PUCCH2. When the feedback flag is not equal to the preset value, the UE may not send the stored HARQ-ACK on PUCCH2.

In some embodiments, the preset rule in the method 400 may include whether a numerical K1 in a received DCI is smaller than a preset threshold or belongs to a set of preset values. When the numerical K1 in a received DCI is smaller than the preset threshold or belongs to the set of preset values, the UE may send a corresponding HARQ-ACK. When the numerical K1 in a received DCI is not smaller than the preset threshold and does not belong to the set of preset values, the UE may not send the corresponding HARQ-ACK. For example but not limited to, the UE may wait for a next DCI including a numerical K1 and a proper K1 value to send the corresponding HARQ-ACK; or the UE may remove the corresponding HARQ-ACK and/or do not send the corresponding HARQ-ACK. For example but not limited to, in one implementation, the preset threshold may be 3, 5, or 10; and the set of preset values may include one or more preset values, for example {0}, {0, 1}, or {0, 1, 2, 3, 4, 5}.

In one implementation referring to FIG. 5C, the DCI-2 520 may include a numerical K1-2. In response to the numerical K1-2 being smaller than a preset threshold or belonging to a set of preset values, the UE may send a HARQ-ACK corresponding to PDSCH-1 on PUCCH2. In response to the numerical K1-2 not being smaller than the preset threshold and not belonging to the set of preset values, the UE may not send the HARQ-ACK corresponding to PDSCH-1 on PUCCH2. In another implementation, the previously-received DCI (DCI-1) may include a non-numerical K1-1, and the corresponding HARQ-ACK may be the HARQ-ACK stored by the UE according to the PDSCH-1.

In some embodiments, the preset rule in the method 400 may include whether a scheduling DCI comprises a K1-deadline and a PUCCH resource carrying the HARQ-ACK is not later than another PUCCH resource corresponding to the K1-deadline. When the PUCCH resource carrying the HARQ-ACK is not later than another PUCCH resource corresponding to the K1-deadline in the scheduling DCI, the UE may send the corresponding HARQ-ACK. When the PUCCH resource carrying the HARQ-ACK is later than another PUCCH resource corresponding to the K1-deadline in the scheduling DCI, the UE may not send the corresponding HARQ-ACK. For example but not limited to, the UE may remove the corresponding HARQ-ACK and/or do not send the corresponding HARQ-ACK.

Figure 5G:
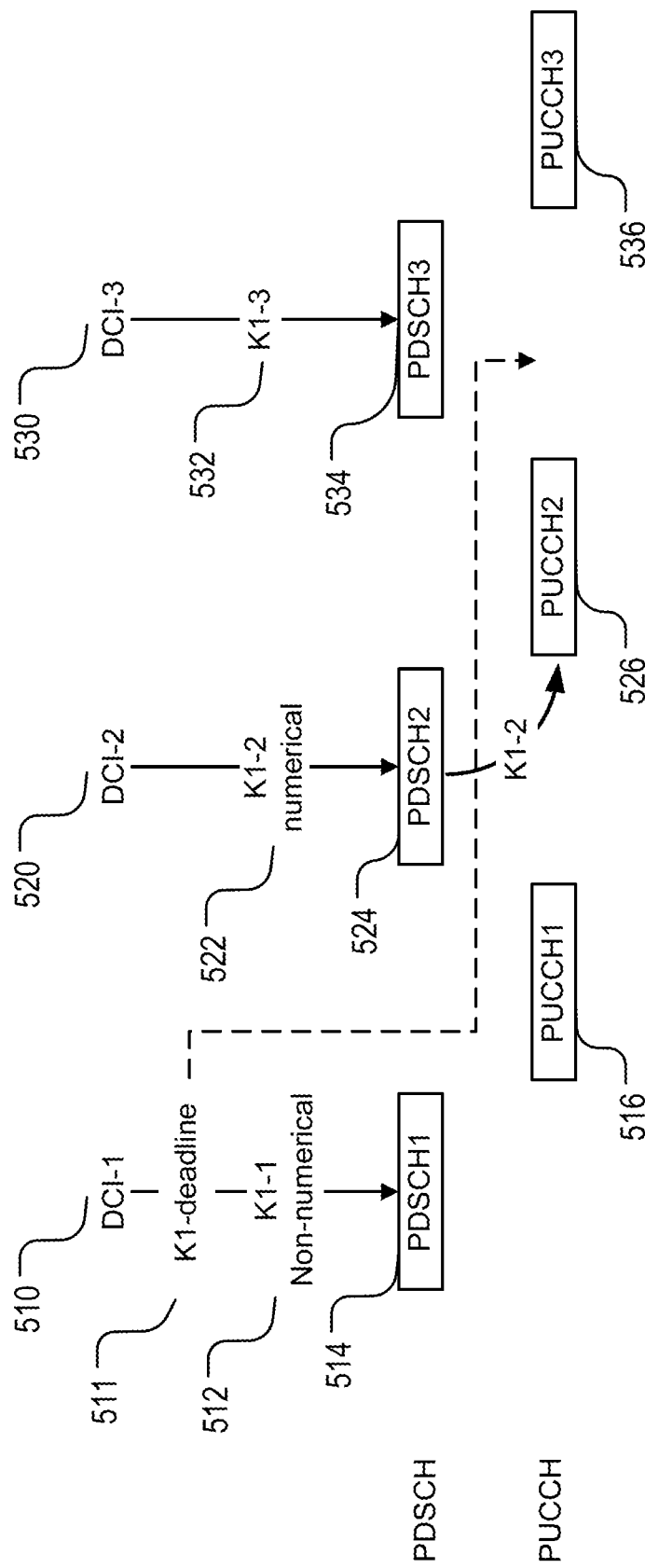
FIG. 5G shows another exemplary embodiment of transmitting feedback information.
Figure 5H:
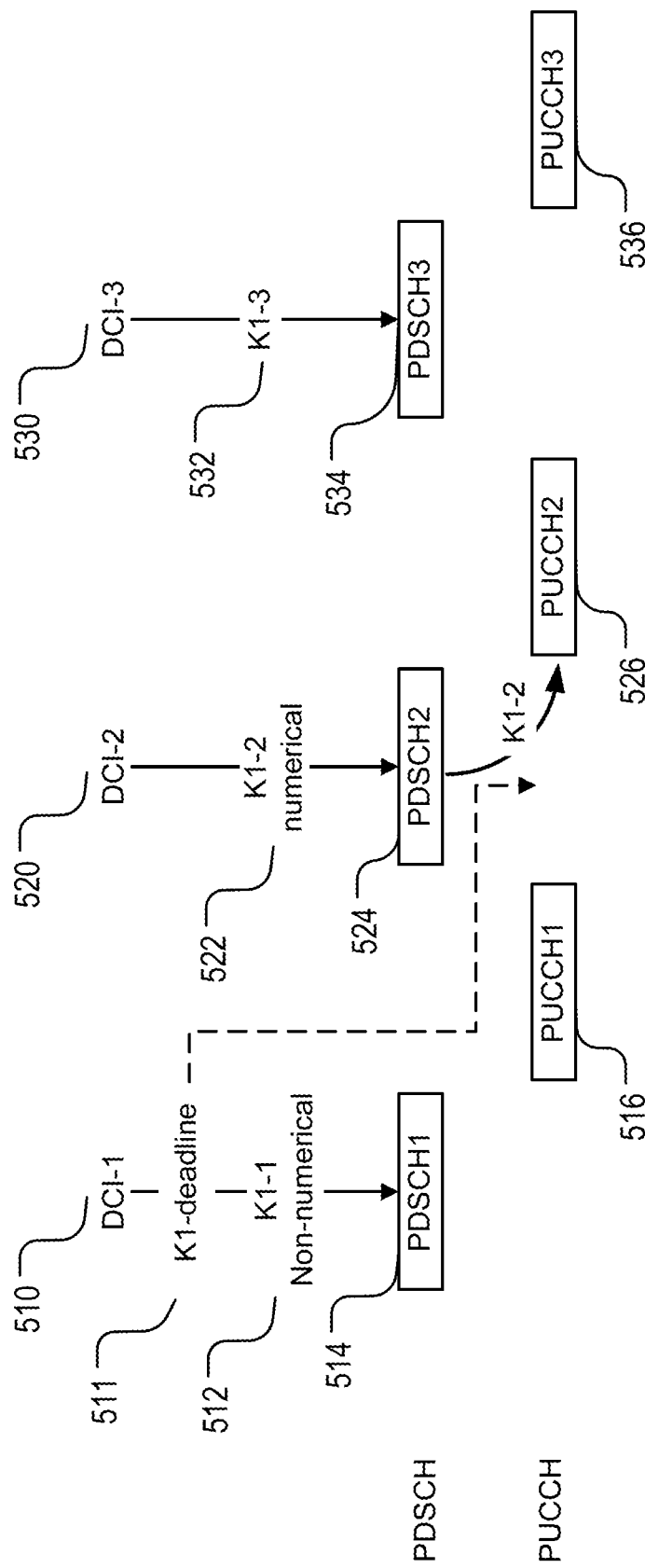
FIG. 5H shows another exemplary embodiment of transmitting feedback information.

In some implementations referring to FIGS. 5G-5H, the DCI-1 510 may include a non-numerical K1-1 512 and a K1-deadline 511. The K1-deadline my indicate whether the UE sends a corresponding HARQ-ACK. In one implementation, the corresponding HARQ-ACK may be a stored HARQ-ACK by the UE according to the PDSCH-1 scheduled corresponding to the DCI-1 including the non-numerical K1-1. The DCI-2 may include a numerical K1-2, and the PUCCH2 corresponds to the PDSCH2 based on the numerical K1-2. In one implementation, when the PUCCH2 is not later in time than a PUCCH resource corresponding to the K1-deadline as shown in FIG. 5G, the UE may send the stored HARQ-ACK on PUCCH2. In another implementation, when the PUCCH2 is later in time than the PUCCH resource corresponding to the K1-deadline as shown in FIG. 5H, the UE may not send the stored HARQ-ACK on PUCCH2.

Figure 5I:
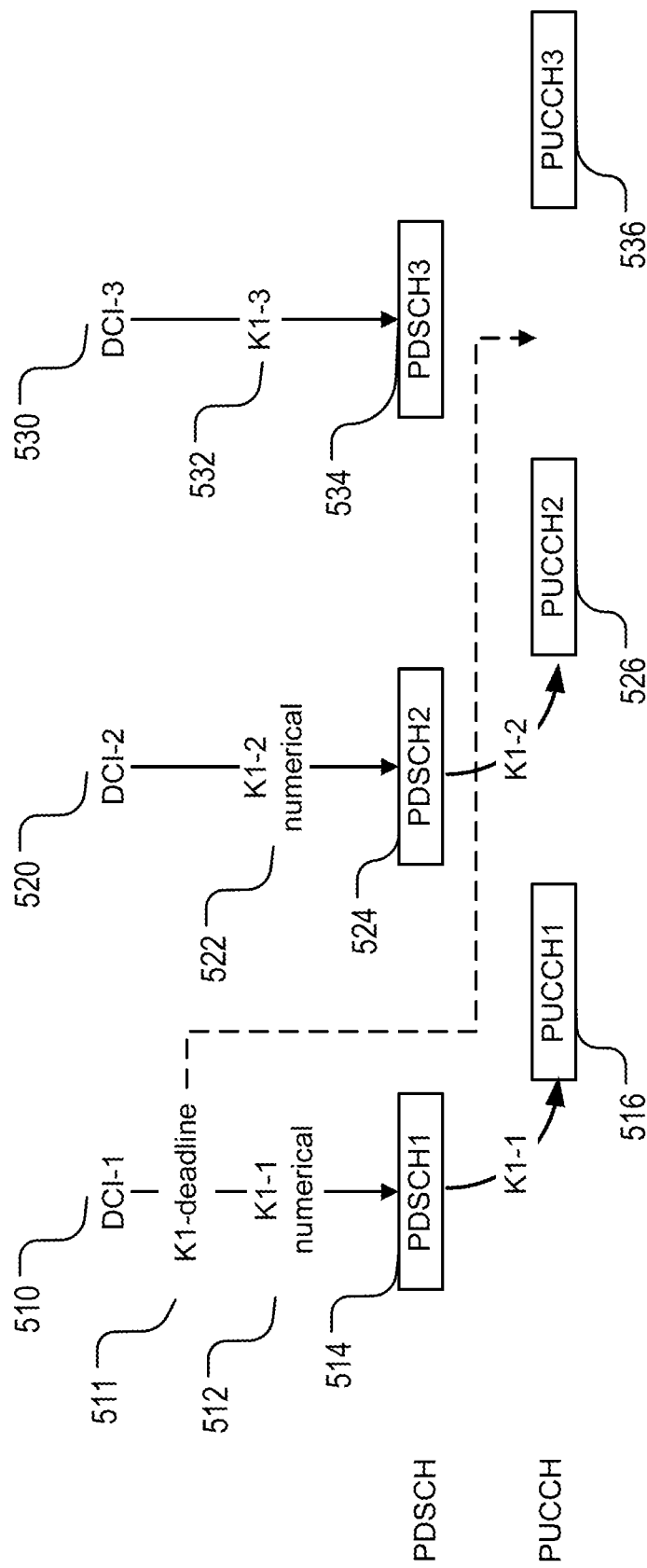
FIG. 5I shows another exemplary embodiment of transmitting feedback information.
Figure 5J:
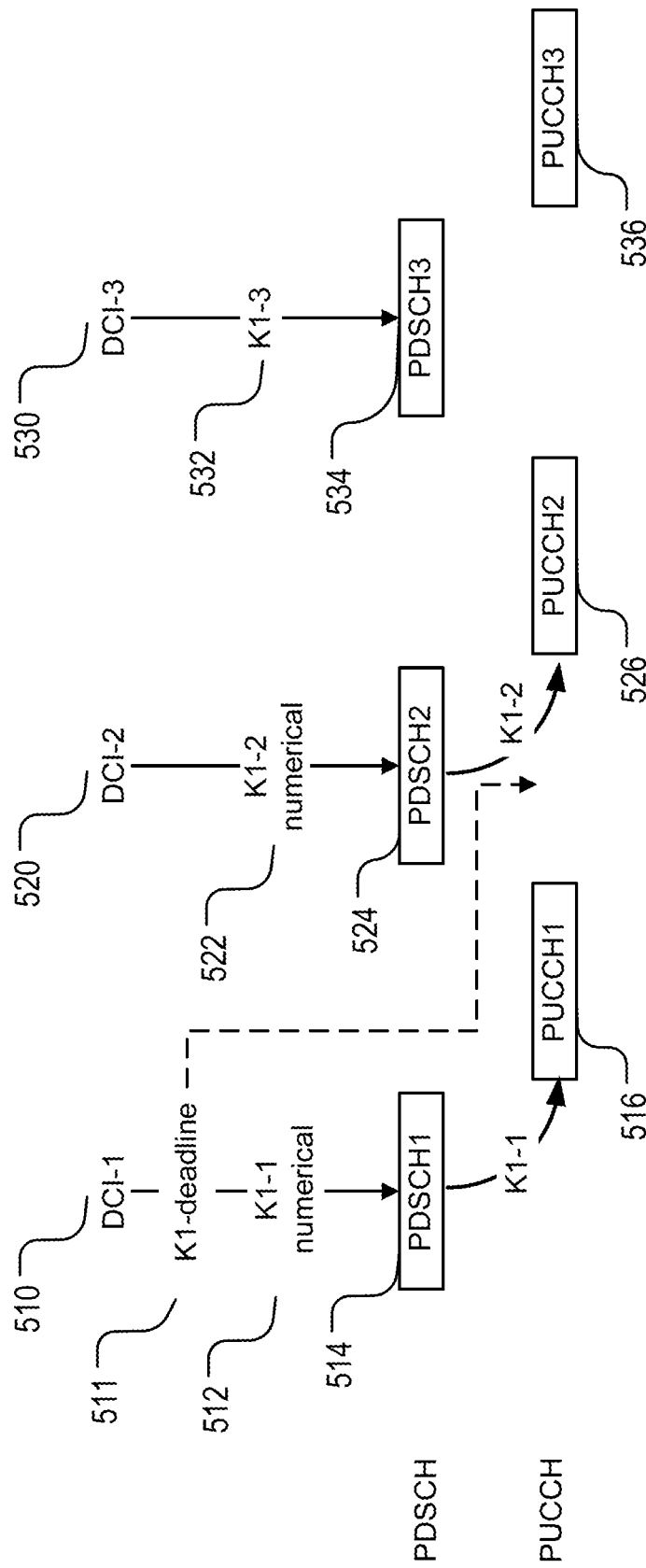
FIG. 5J shows another exemplary embodiment of transmitting feedback information.

In other implementations referring to FIGS. 5I-5J, the DCI-1 510 may include a numerical K1-1 512 and a K1-deadline 511. The K1-deadline my indicate whether the UE sends a corresponding HARQ-ACK. In one implementation, the PUCCH1 based on the numerical K1-1 may lose during resource competition, and the corresponding HARQ-ACK may be stored to be transmitted at a later PUCCH resource. The UE may receive DCI-2 including a numerical K1-2, and the PUCCH2 corresponds to the PDSCH2 based on the numerical K1-2. In one implementation, when the PUCCH2 succeeds in resource competition and is not later in time than a PUCCH resource corresponding to the K1-deadline as shown in FIG. 5I, the UE may send the stored HARQ-ACK on PUCCH2. In another implementation, when the PUCCH2 is later in time than the PUCCH resource corresponding to the K1-deadline as shown in FIG. 5J, the UE may not send the stored HARQ-ACK on PUCCH2.

In some embodiments, the preset rule in the method 400 may include whether a time interval between a PUCCH resource (or a physical uplink shared channel (PUSCH) resource) configured to carry the HARQ-ACK and a PDSCH corresponding to the HARQ-ACK is not larger than a preset interval threshold. When the time interval between the PUCCH resource (or the PUSCH resource) configured to carry the HARQ-ACK and the PDSCH corresponding to the HARQ-ACK is not larger than the preset interval threshold, the UE may send the corresponding HARQ-ACK on the PUCCH resource (or the PUSCH resource, respectively). When the time interval between the PUCCH resource (or the PUSCH resource) configured to carry the HARQ-ACK and the PDSCH corresponding to the HARQ-ACK is larger than the preset interval threshold, the UE may not send the corresponding HARQ-ACK. For example but not limited to, the UE may remove the corresponding HARQ-ACK and/or do not send the corresponding HARQ-ACK.

Figure 5K:
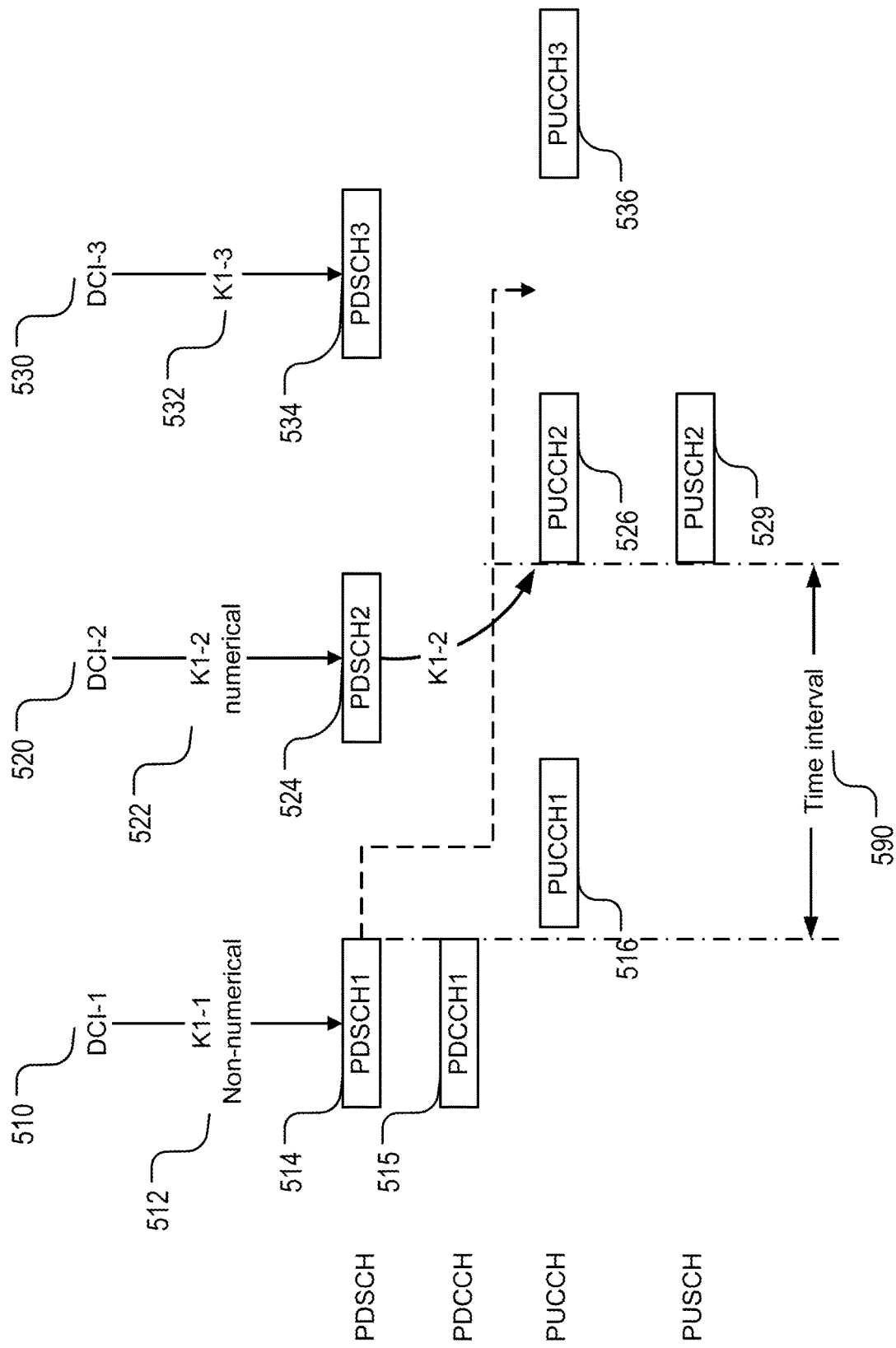
FIG. 5K shows another exemplary embodiment of transmitting feedback information.

In one implementation referring to FIG. 5K, the DCI-1 510 may include a non-numerical K1-1 512. A preset interval threshold may be configured by a received DCI from the network base station or is configured by a radio resource control (RRC) based on the network base station. In one implementation, the corresponding HARQ-ACK may be a stored HARQ-ACK by the UE according to the PDSCH-1 scheduled corresponding to the DCI-1 including the non-numerical K1-1. The DCI-2 may include a numerical K1-2, and the PUCCH2 corresponds to the PDSCH2 based on the numerical K1-2. A time interval 590 may be between the PUCCH2 configured to carry the HARQ-ACK and the PDSCH-1 corresponding to the HARQ-ACK. When the time interval 590 is not larger than a preset interval threshold, the UE may send the stored HARQ-ACK on PUCCH2. When the time interval 590 is larger than the preset interval threshold, the UE may not send the stored HARQ-ACK on PUCCH2. In another implementation, a PUSCH2 may be configured to carry a HARQ-ACK. A time interval 590 may be between the PUSCH2 and the PDSCH-1. When the time interval 590 is not larger than a preset interval threshold, the UE may send the stored HARQ-ACK on PUSCH2. When the time interval 590 is larger than the preset interval threshold, the UE may not send the stored HARQ-ACK on PUSCH2.

In some embodiments, the preset rule in the method 400 may include whether a time interval between a PUCCH resource (or a PUSCH resource) configured to carry the HARQ-ACK and a PDCCH scheduled a PDSCH corresponding to the HARQ-ACK is not larger than a preset interval threshold. When the time interval between the PUCCH resource (or the PUSCH resource) configured to carry the HARQ-ACK and the PDCCH based on the PDSCH corresponding to the HARQ-ACK is not larger than the preset interval threshold, the UE may send the corresponding HARQ-ACK on the PUCCH resource (or the PUSCH resource, respectively). When the time interval between the PUCCH resource (or the PUSCH resource) configured to carry the HARQ-ACK and the PDCCH based on the PDSCH corresponding to the HARQ-ACK is larger than the preset interval threshold, the UE may not send the corresponding HARQ-ACK. For example but not limited to, the UE may remove the corresponding HARQ-ACK and/or do not send the corresponding HARQ-ACK.

Referring to FIG. 5K, the DCI-1 510 may include a non-numerical K1-1 512. In one implementation, the corresponding HARQ-ACK may be a stored HARQ-ACK by the UE according to the PDSCH-1 scheduled corresponding to the DCI-1 including the non-numerical K1-1. A PDCCH1 515 may be configured based on the PDSCH-1. The DCI-2 may include a numerical K1-2, and the PUCCH2 corresponds to the PDSCH2 based on the numerical K1-2. A time interval 590 may be between the PUCCH2 configured to carry the HARQ-ACK and the PDCCH1 based on the PDSCH-1 corresponding to the HARQ-ACK. When the time interval 590 is not larger than a preset interval threshold, the UE may send the stored HARQ-ACK on PUCCH2. When the time interval 590 is larger than the preset interval threshold, the UE may not send the stored HARQ-ACK on PUCCH2. In another implementation, a PUSCH2 may be configured to carry a HARQ-ACK. A time interval 590 may be between the PUSCH2 and the PDCCH1. When the time interval 590 is not larger than a preset interval threshold, the UE may send the stored HARQ-ACK on PUSCH2. When the time interval 590 is larger than the preset interval threshold, the UE may not send the stored HARQ-ACK on PUSCH2.

Figure 5L:
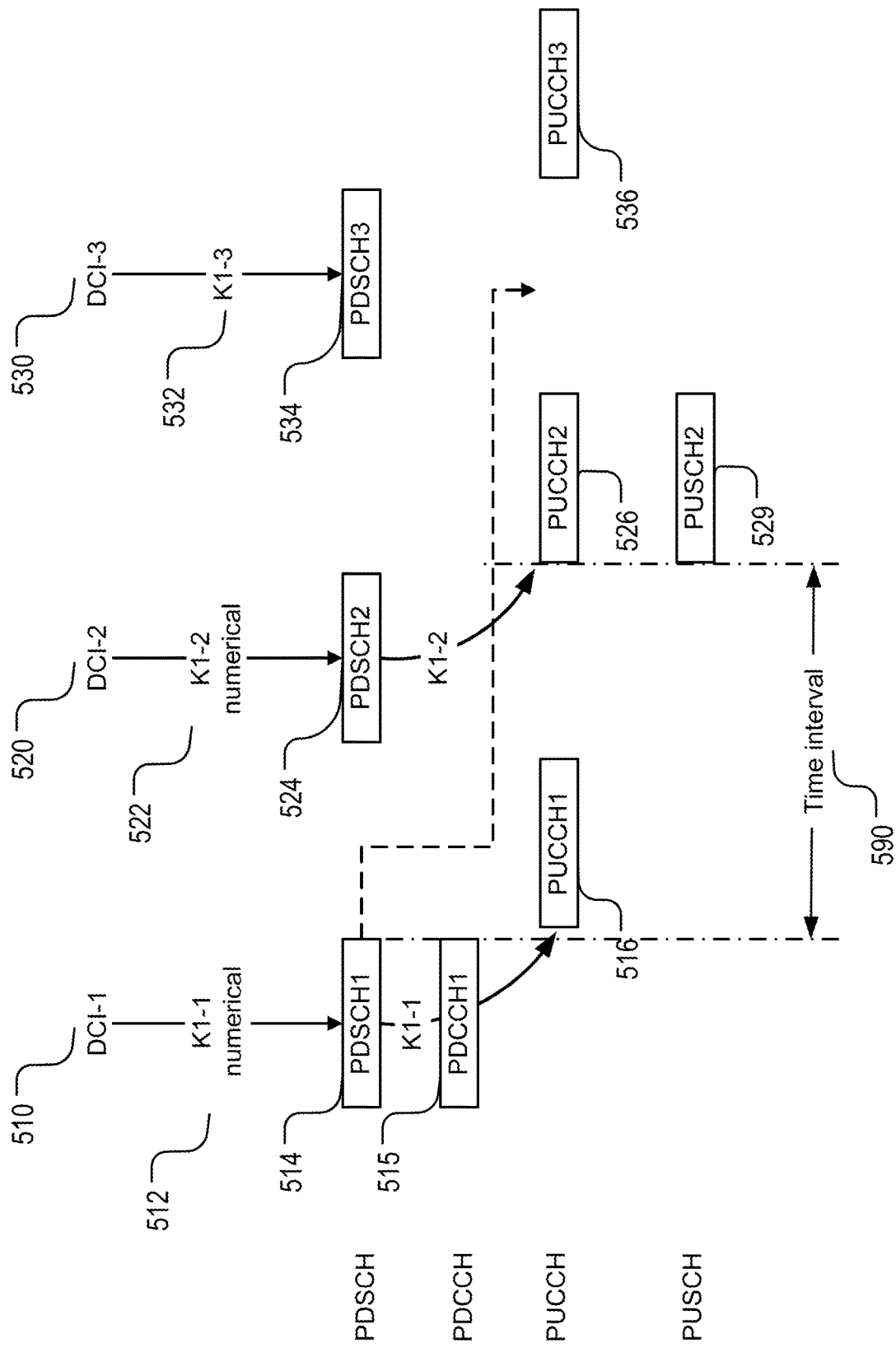
FIG. 5L shows another exemplary embodiment of transmitting feedback information.

In another implementation referring to FIG. 5L, the DCI-1 510 may include a numerical K1-1 512. A preset interval threshold may be configured by a received DCI from the network base station or is configured by a radio resource control (RRC) based on the network base station. In one implementation, the PUCCH1 based on the numerical K1-1 may lose during resource competition, and the corresponding HARQ-ACK may be stored to be transmitted at a later PUCCH or PUSCH resource. The UE may receive a DCI-2 including a numerical K1-2, and the PUCCH2 or PUSCH2 corresponds to the PDSCH2 based on the numerical K1-2. A time interval 590 may be between the PUCCH2 or PUSCH2 configured to carry the HARQ-ACK and the PDSCH-1 corresponding to the HARQ-ACK. When the time interval 590 is not larger than a preset interval threshold, the UE may send the stored HARQ-ACK on PUCCH2 or PUSCH2. When the time interval 590 is larger than the preset interval threshold, the UE may not send the stored HARQ-ACK on PUCCH2 or PUSCH2. In another implementation, a PDCCH1 515 may be configured based on the PDSCH-1. A time interval 590 may be between the PUCCH2 or PUSCH2 and the PDCCH1. When the time interval 590 is not larger than a preset interval threshold, the UE may send the stored HARQ-ACK on PUCCH2 or PUSCH2. When the time interval 590 is larger than the preset interval threshold, the UE may not send the stored HARQ-ACK on PUCCH2 or PUSCH2.

The present disclosure describes methods, apparatus, and computer-readable medium for wireless communication. The present disclosure addressed the issues with transmitting feedback information. The methods, devices, and computer-readable medium described in the present disclosure may facilitate the performance of URLLC transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for transmitting feedback information by a communication node, comprising:
   sending a hybrid automated repeat request-acknowledgement (HARQ-ACK) in response to a preset rule being satisfied, by:
   using a physical uplink control channel (PUCCH) resource to carry the HARQ-ACK, the PUCCH resource being selected from at least two configured PUCCH resources, wherein:
one of the two configured PUCCH resources is a configured PUCCH resource on a first cell, and
another of the two configured PUCCH resources is a configured PUCCH resource on a second cell; and
wherein the sending the HARQ-ACK comprises:
receiving a downlink control information (DCI) comprising a feedback-carrier selection flag, the feedback-carrier selection flag in the DCI indicating which one of the two configured PUCCH resources on the first and second cells is selected to transmit the HARQ-ACK.

2. The method according to claim 1, wherein:
the preset rule comprises whether the HARQ-ACK is generated; and
the communication node comprises a user equipment.

3. The method according to claim 1, wherein:
the preset rule comprises whether the HARQ-ACK is generated;
the communication node comprises a user equipment; and
a physical downlink shared channel (PDSCH) scheduled corresponding to the HARQ-ACK are configured with at least two cells for PUCCH transmission.

4. The method according to claim 1, wherein sending the HARQ-ACK further comprises:
in response to the feedback-carrier selection flag in the DCI being a preset first cell enable value, transmitting, by the user equipment, the HARQ-ACK on the configured PUCCH resource on the first cell; and
in response to the feedback-carrier selection flag in the DCI being a preset second cell enable value, transmitting, by the user equipment, the HARQ-ACK on the configured PUCCH resource on the second cell.

5. The method according to claim 1, wherein:
the preset rule is whether a feedback flag in the received DCI is equal to a preset value;
the received DCI comprises a numerical K1; and
the HARQ-ACK comprises a stored HARQ-ACK according to a physical downlink shared channel (PDSCH) scheduled corresponding to a previously-received DCI comprising a non-numerical K1.

6. The method according to claim 1, wherein:
the preset rule is whether a numerical K1 in the received DCI is smaller than a preset threshold or belongs to a set of preset values.

7. The method according to claim 1, wherein:
the preset rule is that the DCI comprises a K1-deadline and the PUCCH resource carrying the HARQ-ACK is not later than another PUCCH resource corresponding to the K1-deadline.

8. The method according to claim 7, wherein:
the DCI comprises a non-numerical K1; and
the HARQ-ACK comprises a stored HARQ-ACK according to a physical downlink shared channel (PDSCH) scheduled by the DCI.

9. The method according to claim 1, wherein:
the preset rule comprises whether a time interval between the PUCCH resource configured to carry the HARQ-ACK and a PDSCH corresponding to the HARQ-ACK is not larger than a preset interval threshold.

10. The method according to claim 1, wherein:
the preset rule comprises whether a time interval between the PUCCH resource configured to carry the HARQ-ACK and a PDCCH based on a PDSCH corresponding to the HARQ-ACK is not larger than a preset interval threshold.

11. An apparatus comprising:
a memory storing instructions; and
a processor in communication with the memory, wherein, when the processor executes the instructions, the processor is configured to cause the apparatus to perform:
sending a hybrid automated repeat request-acknowledgement (HARQ-ACK) in response to a preset rule being satisfied, by:
using a physical uplink control channel (PUCCH) resource to carry the HARQ-ACK, the PUCCH resource being selected from at least two configured PUCCH resources,
wherein:
one of the two configured PUCCH resources is a configured PUCCH resource on a first cell, and
another of the two configured PUCCH resources is a configured PUCCH resource on a second cell; and
wherein the sending the HARQ-ACK comprises:
receiving a downlink control information (DCI) comprising a feedback-carrier selection flag, the feedback-carrier selection flag in the DCI indicating which one of the two configured PUCCH resources on the first and second cells is selected to transmit the HARQ-ACK.

12. The apparatus according to claim 11, wherein:
the preset rule is whether a numerical K1 in the DCI is smaller than a preset threshold or belongs to a set of preset values.

13. The apparatus according to claim 11, wherein:
the preset rule is that the DCI comprises a K1-deadline and the PUCCH resource carrying the HARQ-ACK is not later than another PUCCH resource corresponding to the K1-deadline.

14. The apparatus according to claim 13, wherein:
the DCI comprises a non-numerical K1; and
the HARQ-ACK comprises a stored HARQ-ACK according to a physical downlink shared channel (PDSCH) scheduled by the DCI.

15. The apparatus according to claim 11, wherein:
the preset rule comprises whether a time interval between the PUCCH resource configured to carry the HARQ-ACK and a PDSCH corresponding to the HARQ-ACK is not larger than a preset interval threshold.

16. The apparatus according to claim 11, wherein:
the preset rule comprises whether a time interval between the PUCCH resource configured to carry the HARQ-ACK and a PDCCH based on a PDSCH corresponding to the HARQ-ACK is not larger than a preset interval threshold.

17. A non-transitory computer-readable medium storing instructions, wherein, the instructions, when executed by a processor, are configured to cause the processor to perform:
sending a hybrid automated repeat request-acknowledgement (HARQ-ACK) in response to a preset rule being satisfied, by:
using a physical uplink control channel (PUCCH) resource to carry the HARQ-ACK, the PUCCH resource being selected from at least two configured PUCCH resources,
wherein:
one of the two configured PUCCH resources is a configured PUCCH resource on a first cell, and
another of the two configured PUCCH resources is a configured PUCCH resource on a second cell; and
wherein the sending the HARQ-ACK comprises:
receiving a downlink control information (DCI) comprising a feedback-carrier selection flag, the feedback-carrier selection flag in the DCI indicating which one of the two configured PUCCH resources on the first and second cells is selected to transmit the HARQ-ACK.

18. The non-transitory computer-readable medium according to claim 17, wherein:
   the preset rule is whether a numerical K1 in the DCI is smaller than a preset threshold or belongs to a set of preset values.

19. The non-transitory computer-readable medium according to claim 17, wherein:
   the preset rule is that the DCI comprises a K1-deadline and the PUCCH resource carrying the HARQ-ACK is not later than another PUCCH resource corresponding to the K1-deadline.

20. The non-transitory computer-readable medium according to claim 19, wherein:
   the DCI comprises a non-numerical K1; and
   the HARQ-ACK comprises a stored HARQ-ACK according to a physical downlink shared channel (PDSCH) scheduled by the DCI.

* * * * *